United States Patent
Gutscher

(10) Patent No.: US 9,551,372 B2
(45) Date of Patent: Jan. 24, 2017

(54) SNAP RING

(71) Applicant: HUGO BENZING GMBH & CO. KG, Kortnal-Münchingen (DE)

(72) Inventor: Horst Gutscher, Leonberg (DE)

(73) Assignee: Hugo Benzing GmbH & Co. KG, Korntal-Münchingen (DE)

( * ) Notice: Subject to any disclaimer, the term of this patent is extended or adjusted under 35 U.S.C. 154(b) by 0 days.

(21) Appl. No.: 14/417,727

(22) PCT Filed: Jun. 21, 2013

(86) PCT No.: PCT/EP2013/062969
§ 371 (c)(1),
(2) Date: Jan. 27, 2015

(87) PCT Pub. No.: WO2014/001211
PCT Pub. Date: Jan. 3, 2014

(65) Prior Publication Data
US 2015/0167720 A1    Jun. 18, 2015

(30) Foreign Application Priority Data
Jun. 28, 2012 (DE) .................. 20 2012 102 395

(51) Int. Cl.
*F16B 21/18* (2006.01)

(52) U.S. Cl.
CPC .................. *F16B 21/186* (2013.01)

(58) Field of Classification Search
CPC ........ F16B 21/18; F16B 21/186; F16B 21/183
USPC .......................... 411/517–519, 353
See application file for complete search history.

(56) References Cited

U.S. PATENT DOCUMENTS

| | | | | |
|---|---|---|---|---|
| 1,970,449 A | * | 8/1934 | Gibbons | F16C 19/26 384/570 |
| 2,544,631 A | * | 3/1951 | Brozek | F16B 21/18 411/518 |
| 2,595,787 A | | 5/1952 | Heimann | |
| 2,959,073 A | * | 11/1960 | Doerfer | F16B 21/186 411/517 |
| 3,104,905 A | * | 9/1963 | Erdmann | B25B 27/205 138/89 |
| 3,397,727 A | * | 8/1968 | Orosz | F16B 5/0208 411/105 |
| 4,671,678 A | | 6/1987 | Münch | |
| 4,687,399 A | * | 8/1987 | Petrie | B65G 47/256 403/326 |
| 5,383,938 A | * | 1/1995 | Rohr | A61F 2/34 623/22.29 |

(Continued)

FOREIGN PATENT DOCUMENTS

DE      830 716 B    2/1952
DE      848 002      9/1952

(Continued)

*Primary Examiner* — Flemming Saether
(74) *Attorney, Agent, or Firm* — Pauley Erickson & Kottis

(57) ABSTRACT

A snap ring which has a substantially radially directed ring section with a support surface and a substantially axially directed ring section with a lateral surface, the two ring sections forming an L-shaped cross-section, and a ring gap. For ease of use, at least one of the two end sections that face each other in the ring gap is turned outward in the radial direction in relation to the rest of the ring profile by bending, and, in the bent region, the axial ring section has a notch.

9 Claims, 2 Drawing Sheets

(56) References Cited

U.S. PATENT DOCUMENTS

| | | | |
|---|---|---|---|
| 7,051,897 B2 * | 5/2006 | McGuire | B01J 3/03 220/234 |
| D690,191 S * | 9/2013 | Takakuwa | D8/354 |
| 2004/0166946 A1 | 8/2004 | Bommarito et al. | |

FOREIGN PATENT DOCUMENTS

| | | |
|---|---|---|
| DE | 1 903 295 U | 10/1964 |
| DE | 33 46 661 C2 | 7/1985 |
| DE | 60 2004 002 940 T2 | 2/2007 |
| DE | 10 2010 053001 A1 | 6/2011 |
| EP | 1 681 477 A1 | 7/2006 |
| JP | S59 96412 U | 6/1984 |

* cited by examiner

SNAP RING

BACKGROUND OF THE INVENTION

Field of the Invention

This invention relates to a snap ring in which an essentially radially oriented ring section with a support surface and an essentially axially oriented ring section with a circumferential surface form an L-shaped cross-section and there is an annular gap.

Discussion of Related Art

When a snap ring of this kind with an L-shaped cross-section, as disclosed in German Patent Reference DE 33 46 661 C2, is used, it offers the possibility of supporting a machine element in the axial direction in a cylindrical cavity of a part of the machine. The axially oriented circumferential surface, with its outside, rests against the inner wall of the cavity and the radially inward oriented support surface constitutes a support for absorbing axially oriented forces. Contrarily, it is also possible for the axially oriented circumference surface to be situated at the inside of the ring and for the radially oriented support surface to point outward in order to mount the snap ring on an axle or shaft and to support a hollow, cylindrical machine element in the axial direction. Difficulties can arise with regard to installing such a snap ring and preventing it from rotating.

Other snap rings with an annular gap and end regions that protrude like tabs inward, outward, or in the axial direction are disclosed in German Patent References DE 60 2004 002 940 T2, DE 848 002 B, DE 1 903 295 U, and DE 830 716 B. In addition to the above-mentioned difficulties, there can also be disadvantages relating to production and adaptation.

SUMMARY OF THE INVENTION

One object of this invention is to provide a snap ring of the type mentioned above but which offers advantages with regard to production and/or with regard to installation when used.

This object and others are attained with features of this invention as described in this specification and the claims. In this case, at least one of the two end sections oriented toward the annular gap is flared in the radial plane, the plane normal to the axis, in relation to the rest of the annular curve by bending and in the bending region, the axial ring section is provided with a notch.

On the one hand, the at least one flared end section offers advantageous installation possibilities, for example by a tool, and on the other hand, offers a possibility of a rotationally secured placement in or on a machine part. In addition, with a stable embodiment of the snap ring out of hardened spring steel, for example, the flared end section can advantageously be embodied by bending and with a high degree of precision. In addition, the desired width of the radial ring section can be adapted within a broad range.

One embodiment of this invention is advantageous for production and assembly if the notch of the bent region extends to the free end of the relevant flared end section.

Various possibilities for adapting to different requirements are achieved if the flared end section is flared outward or inward relative to a tangent to the adjacent ring region by a flaring angle of between 0° and 90°, for example between 5° and 85°, between 10° and 80°, or in particular between 20° and 70°.

A stable support is achieved if the snap ring is made of a hardened spring-elastic metal.

A stable support is also achieved if the axial ring section has a smaller span in the axial direction than the radial ring section has in the radial direction.

One embodiment of the snap ring is advantageous in terms of production and stability if the radial ring section tapers increasingly in the direction from its transition region adjacent to the axial ring section toward its free end.

BRIEF DESCRIPTION OF DRAWINGS

This invention is explained in greater detail below in view of exemplary embodiments taken in conjunction with the drawings, wherein.

DETAILED DESCRIPTION OF INVENTION

Figure 1:
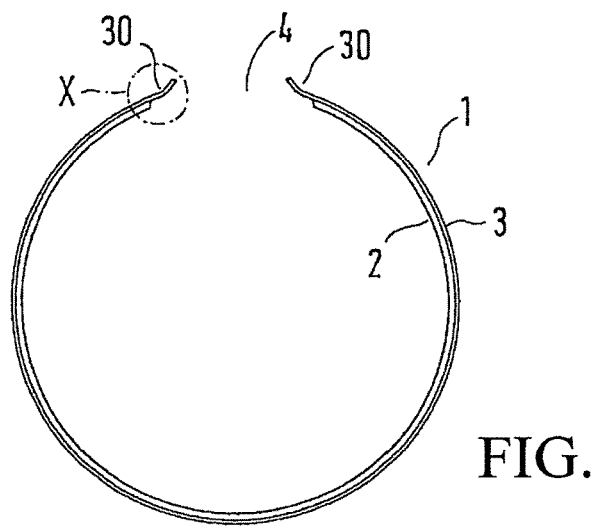
FIG. 1 is a top view of a snap ring.
Figure 3:
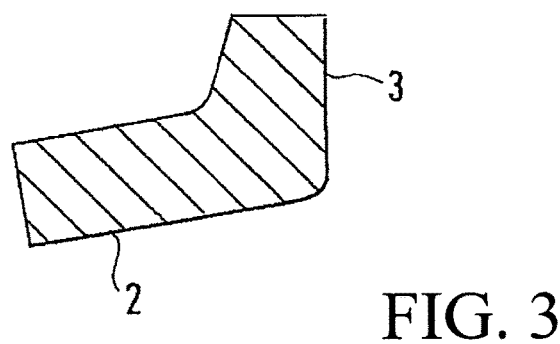
FIG. 3 shows another cross-sectional depiction of an L-shaped snap ring.
Figure 4:
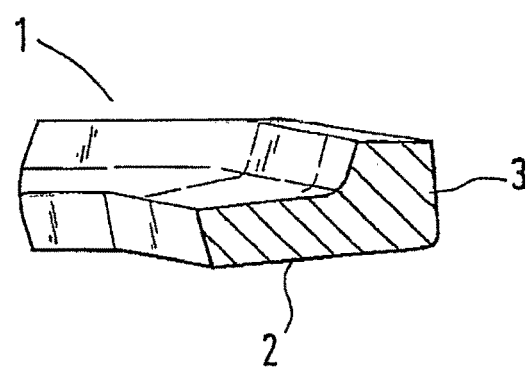
FIG. 4 shows a perspective view of a detail of an L-shaped snap ring according to FIG. 3.

FIG. 1 shows a snap ring 1 made of spring-elastic material, having an annular gap 4, which is embodied for use in a cylindrical cavity or a bore in a part of a machine. In its ring sections oriented toward the annular gap 4, the snap ring 1 has end sections 30 that are flared outward relative to the circumferential contour of the ring. As is evident in connection with FIG. 2A and the cross-section along a section line A-A shown in FIG. 2B, the snap ring 1 has an essentially L-shaped cross-section, with a ring section 2 that is oriented radially inward and an axially oriented ring section 3 integrally adjoined thereto. This design is also shown in FIGS. 3 and 4.

When inserted, the radially oriented ring section 2 of the snap ring 1, on its side oriented away from the axially oriented ring section 3, offers a support surface 2 for a machine element that is supported in the cylindrical cavity or bore in opposition to an axially acting force and rests with the outer surface of the axially oriented ring section 3 against the inner wall of the cavity. The snap ring 1, when correspondingly immobilized in the axial direction, thus offers a collar-like support surface or abutment in the axial direction with a powerful supporting force. As is clear from the cross-sectional depictions, the two L-legs formed by the radial ring section 2 and the axial ring section 3 in the region of the support surface and the circumference surface have an angle that differs from a right angle, in particular an obtuse or other angle such as between 60° and 90°, making it possible, for example, to achieve a spring elasticity in the axial direction as well.

As the cross-sectional depictions in FIGS. 2B, 2C, 3, and 4 also show, the axial ring section 3 can taper increasingly from its transition region into the radial ring section 2 toward its free edge, thus likewise suitably influencing the stability and supporting forces and also permitting a favorable selection of material (material type, geometry). Advantageously, the snap ring 1 is made of a hardened spring-elastic metal, in particular steel.

Figure 2A:
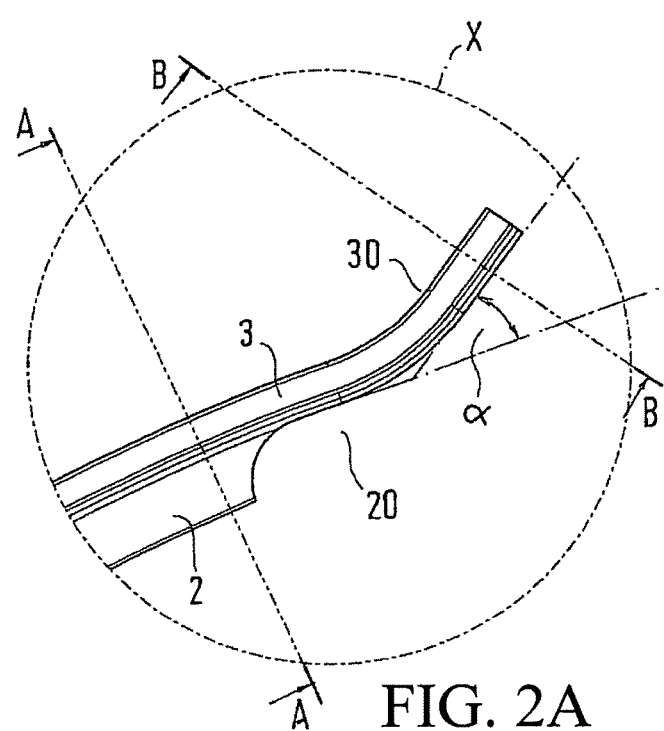
FIG. 2A is an enlarged detail view of an end section of the snap ring according to FIG. 1 in the region of the ring gap (detail X)
Figure 2B:
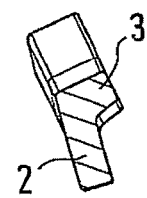
FIG. 2B is a cross-section taken through the ring section according to FIG. 2A, along a section line A-A.
Figure 2C:
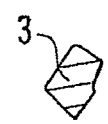
FIG. 2C is a cross-section taken through the ring section according to FIG. 2A in the region of the end section, along a section line B-B.

As FIGS. 1 and 2A also show, the two ring sections oriented toward the annular gap 4 are provided with a notch 20 in the region of or near the respective radially oriented ring section 2. The notch 20 extends across the bending region until the end of the respective end section 30. The bending region can be adjoined by straight sections in the region of the notch 20. In this case, the boundary edge of the notch 20 starts from the inner edge of the radially oriented ring section 2 and then extends continuously across a rounded region into a section spaced a uniform distance apart from the outer contour of the axially oriented ring section 3 in the vicinity of or near its transition region to the radially oriented ring section 2, which is no longer present or only partially present there, as shown by the cross-sectional depiction according to FIG. 2C. This figure shows that the end section 30 can be produced without damaging the material through a defined bending of the snap ring 1 out from the circumference contour while precisely maintaining a flaring angle α relative to a tangent at the starting point of the bend. In this case, snap rings of different hardened materials and/or different geometries can be used.

With the flared end sections 30, it is possible to offer on the one hand, an installation aid for the insertion of the snap ring 1 and on the other hand, a rotation prevention, particularly for the case in which the supported machine element experiences a rotating motion relative to the part of the machine accommodating it. If necessary, the cylindrical cavity is provided with or has a recess in which the end sections 30 can engage. The flaring angle α relative to the tangent at the starting point of the bend generally lies in the range between 0° and 90°, such as between 5° and 90°, 10° and 90°, or 20° and 90°, and can be adapted to the stated requirements within wide latitudes.

In one alternative exemplary embodiment of the snap ring 1, it can be used for installation on an axle or shaft. The radially oriented ring section 2 is oriented outward and the axial ring section 3 is oriented along an inner ring contour and the end sections 30 can be correspondingly flared inward, at an angle to the tangent as indicated above. Then a notch or groove-shaped recess can be provided in the machine part for the end sections 30.

It is also conceivable that the snap ring 1 has only one end section 30 that is flared in the above-mentioned way in only one ring section oriented toward the gap 4.

The snap ring is advantageously made of hardened profile material, such as profile wire, from a coil, with the profile material being wound into a ring in accordance with the diameter of the snap ring 1. Then the notch 20 is produced by punching. In the punched region, the end section 30 is flared outward or inward.

The invention claimed is:

1. A snap ring in which a ring section is essentially oriented in a radial direction with a support surface (2) and a ring section essentially oriented in an axial direction with a circumference surface forming an L-shaped cross-section annular curve and an annular gap, the snap ring comprising two end sections (30) oriented toward the annular gap with at least one of the end sections flared in a radial plane in relation to a remainder of the annular curve by bending and in a bending region, the axial or radial ring section (2, 3) having a notch (20) extending from the bending region to a free end of the relevant flared end section (30).

2. The snap ring according to claim 1, wherein the flared end section (30) is flared by a flaring angle (α) of between 0° and 90°.

3. The snap ring according to claim 2, wherein the snap ring is made of a hardened, spring-elastic metal.

4. The snap ring according to claim 3, wherein the axial ring section (3) has a smaller span in the axial direction than the radial ring section (2) has in the radial direction.

5. The snap ring according to claim 4, wherein the radial ring section (2) tapers increasingly from a transition region adjacent to the axial ring section (3) toward a free edge.

6. The snap ring according to claim 1, wherein the flared end section (30) is flared by a flaring angle (α) of between 0° and 90°.

7. The snap ring according to claim 1, wherein the snap ring is made of a hardened, spring-elastic metal.

8. The snap ring according to claim 1, wherein the axial ring section (3) has a smaller span in the axial direction than the radial ring section (2) has in the radial direction.

9. The snap ring according to claim 1, wherein the radial ring section (2) tapers increasingly from a transition region adjacent to the axial ring section (3) toward a free edge.

* * * * *